United States Patent [19]
Seem

[11] Patent Number: 5,394,672
[45] Date of Patent: Mar. 7, 1995

[54] INTERLOCKING INSULATED ROOF PANEL SYSTEM

[75] Inventor: Charles T. Seem, Mertztown, Pa.

[73] Assignee: Insulok Corp., Mertztown, Pa.

[21] Appl. No.: 96,937

[22] Filed: Jul. 26, 1993

[51] Int. Cl.[6] .............................................. E04C 2/34
[52] U.S. Cl. .................................... 52/809; 52/591.1; 52/592.4
[58] Field of Search ................. 52/478, 809, 530–542, 52/519, 578, 589, 591, 592, 594, 595, 809, 591.1, 592.4

[56] References Cited

U.S. PATENT DOCUMENTS

| | | | |
|---|---|---|---|
| 2,143,166 | 1/1939 | Pattiani | 52/530 |
| 2,231,006 | 2/1941 | Harshberger | 52/539 |
| 2,380,398 | 7/1945 | Booth | 52/534 |
| 3,535,844 | 10/1970 | Glaros | 52/595 |
| 3,899,855 | 8/1975 | Gadsby | 52/90 |
| 3,998,024 | 12/1976 | Frandsen | 52/595 |
| 4,073,377 | 7/1977 | Howell et al. | 52/309.9 |
| 4,100,710 | 7/1978 | Kowallik | 52/309.9 |
| 4,177,615 | 12/1979 | Anderson | 52/478 |
| 4,184,301 | 1/1980 | Anderson et al. | 52/478 |
| 4,186,539 | 2/1980 | Harmon et al. | 52/580 |
| 4,196,554 | 4/1980 | Anderson et al. | 52/394 |
| 4,244,151 | 1/1981 | Seem | 52/60 |
| 4,295,304 | 10/1981 | Kim | 52/90 |
| 4,316,351 | 2/1982 | Ting | 52/309.9 |
| 4,360,553 | 11/1982 | Landheer | 52/578 |
| 4,373,312 | 2/1983 | Kim | 52/309.9 |
| 4,575,981 | 3/1986 | Porter | 52/309.9 |
| 4,744,185 | 5/1988 | Lamberet et al. | 52/309.11 |

FOREIGN PATENT DOCUMENTS 0311738  4/1989  European Pat. Off. ............. 52/578

*Primary Examiner*—James L. Ridgill, Jr.
*Attorney, Agent, or Firm*—Sanford J. Piltch

[57] ABSTRACT

A roof panel construction system adapted structurally for use on a new roof, or over a pre-existing roof, dead level flat or steep, said system comprising a series of panels each having first and second metallic cover sheets, a structural and thermally protective barrier layer encased by said cower sheets and a nose and pocket construction on two adjacent edges formed so that the nose of a first panel will conformably fit into the pocket of a second panel and be mated thereto, said nose and pocket structures further comprising a plurality of sealing strips so that the joints between said panels are automatically sealed and spaced and become resistant to thermal and fluid leakage, said sealing strips being enclosed within the joint to assure maximum effective life of the system.

24 Claims, 3 Drawing Sheets

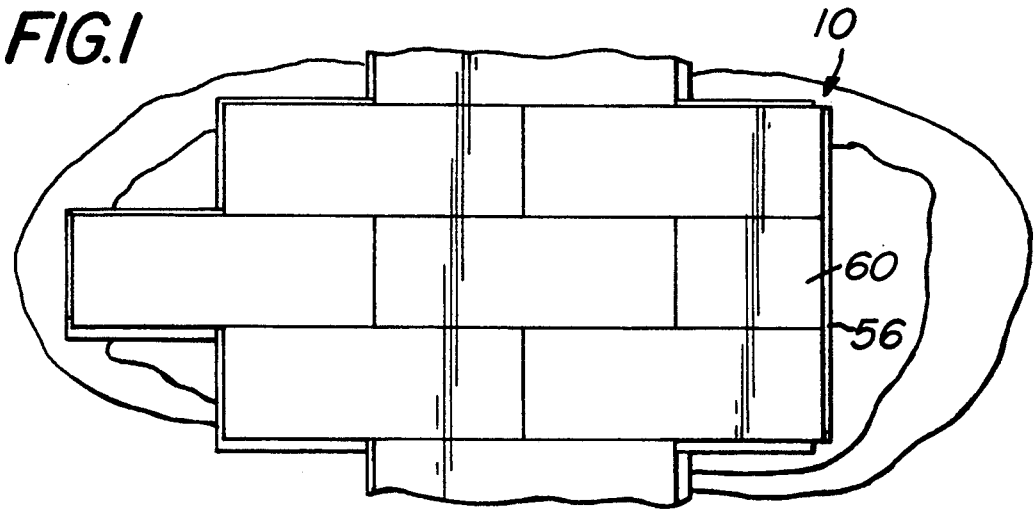
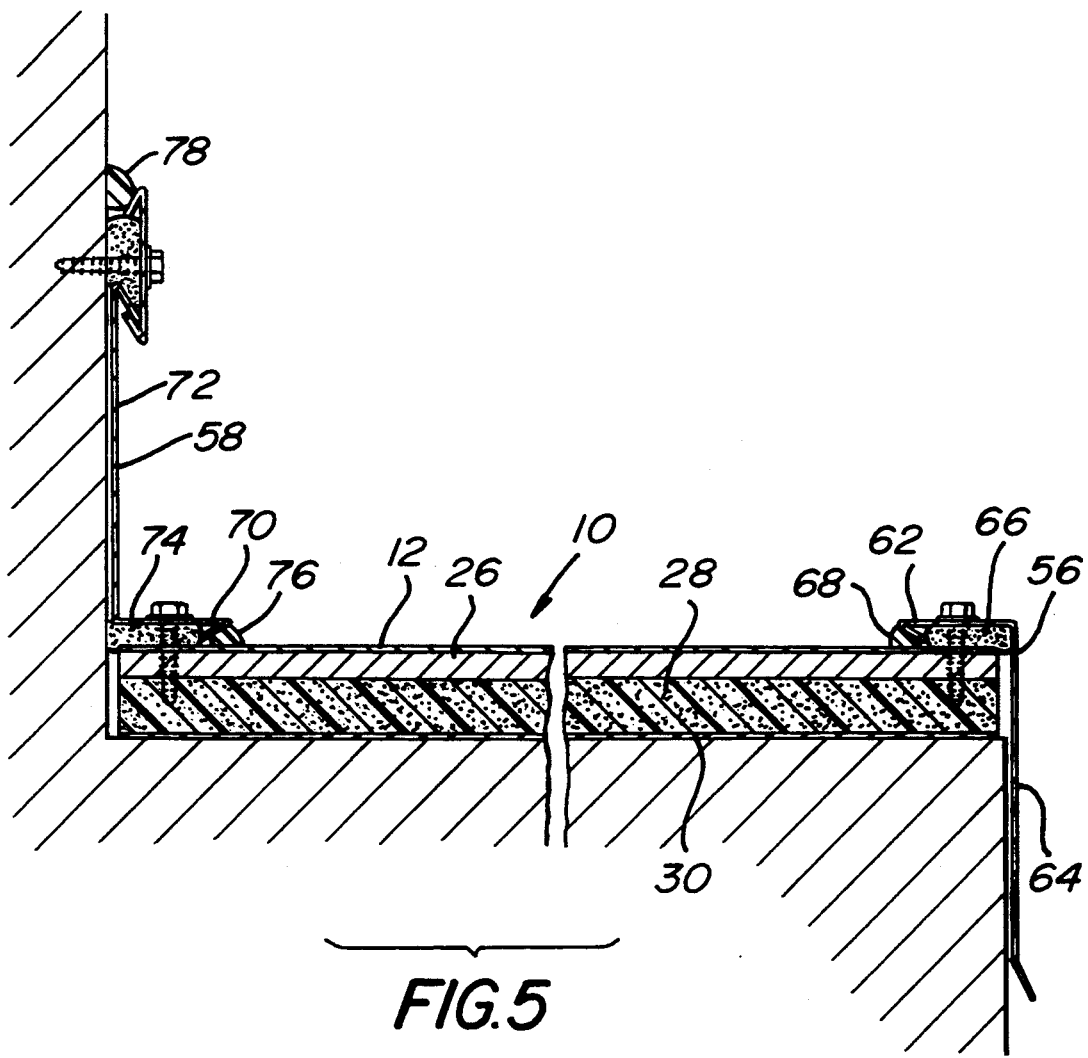

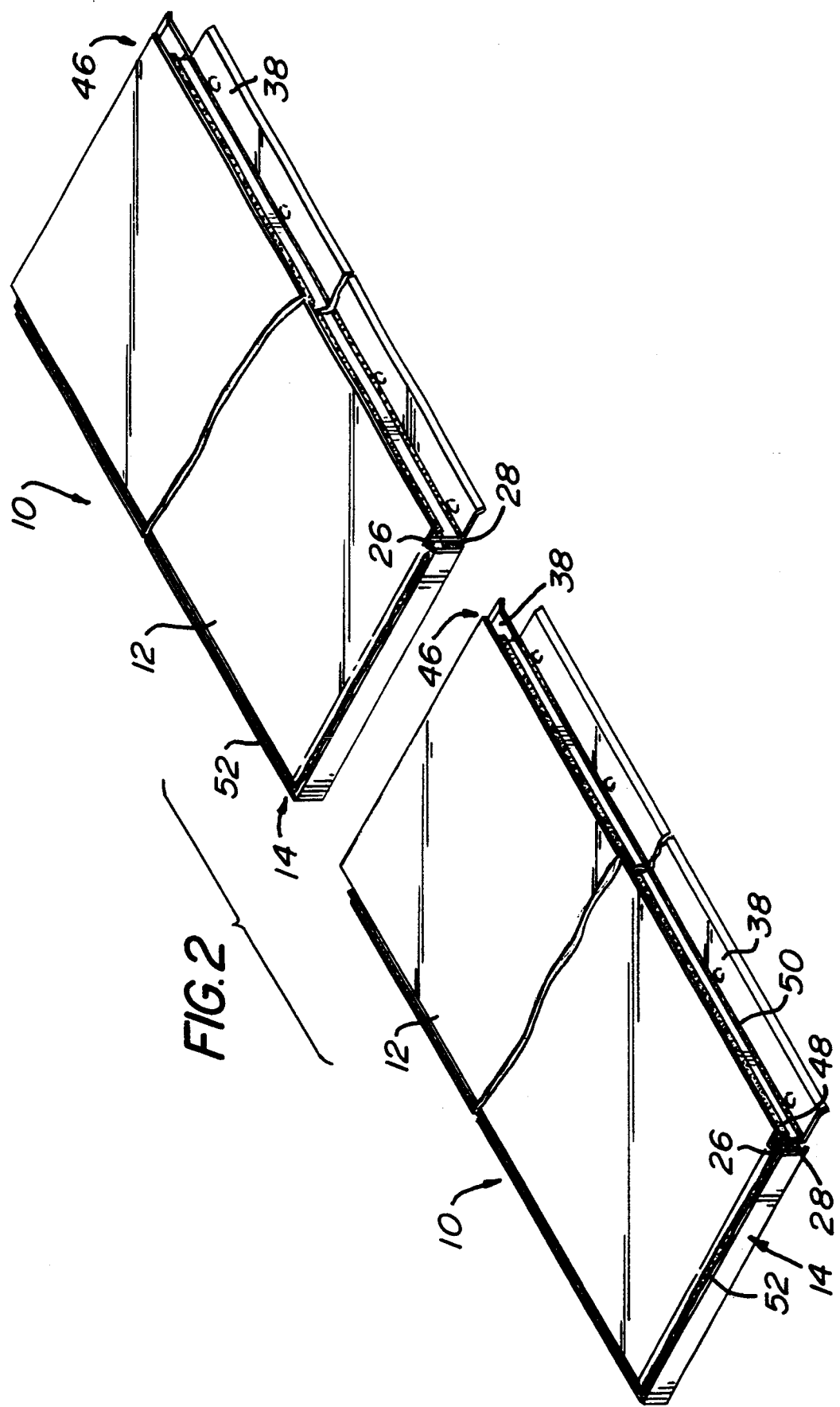

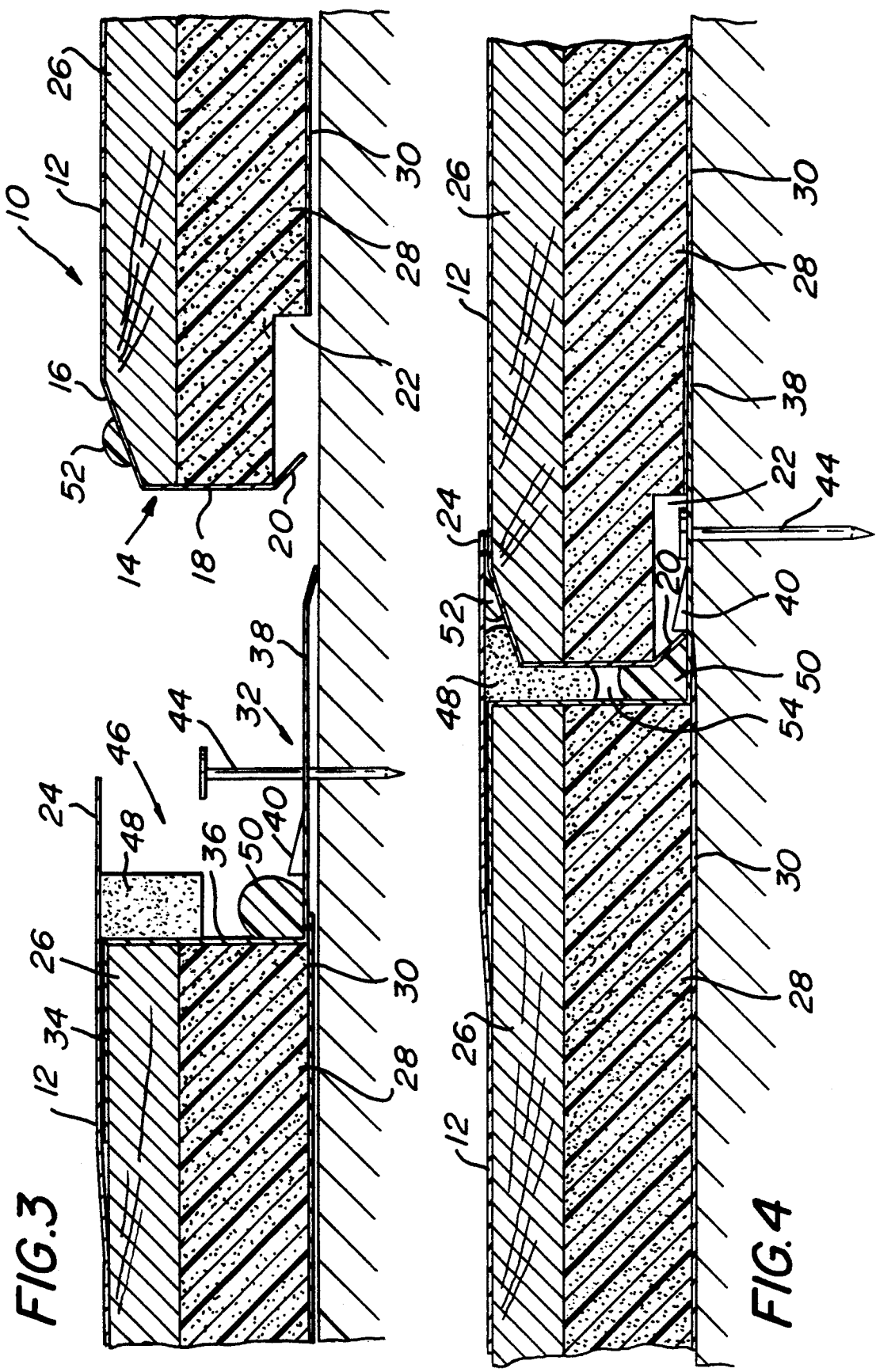

INTERLOCKING INSULATED ROOF PANEL SYSTEM

BACKGROUND OF THE INVENTION

1. Field of the Invention

The present invention relates to thermally insulated building and roofing construction panels of the type formed by a pair of spaced apart metal skins and an interposed thermal insulation material and, more particularly, to such panels having an improved end and side-joint construction with a series of cooperating sealing strips for assembling such panels into a roof structure.

2. Description of the Prior Art

Building and roof construction panels having exterior metal facing sheets and an interposed interior core of a thermal insulation, such as polyurethane or polystyrene foam, or compressed wood or recycled wood fiber, are well known. Also well known are a variety of end and side joints for these panels. Some of these joints are designed to permit the fabrication of the panels with identical external top and bottom facing sheets so that the panel fabricator requires only a single roll-former line to produce these sheets. It is also known to produce panels with different end and side configurations to create a tongue and groove end/side structure to facilitate field erection of the finished panels. Further the use of hidden threaded or nailed fasteners to securely attach such panels and the use of supplemental metal clamping fixtures to retain the panels in position is also known.

One major shortcoming of the thermally insulated double-skinned metal panels of the prior art is their unsatisfactory performance in fire tests, especially when a polyurethane foam is used as the thermally insulating core material. While the thermal properties of such foams are excellent, their well known flammability requires that they be completely encapsulated in a fire resistant material such as the aluminum face sheets of the finished panel. Such encapsulation has proven to be surprisingly effective until the fire induces sufficient stress for the panel joints to fail and spring open to expose the core material to the flames. When this happens the entire panel will catastrophically fail. A panel joint which resists such disengagement will greatly enhance the complete panel fire rating.

A second shortcoming of many of the panels of the prior art is the relative inability of the petroleum pitch or tar, or the polymeric sealing materials used to withstand, over the long term, the environmental assaults of rain, sleet, hail, snow, ozone and other airborne chemicals and ultraviolet light so that, in time, they will fail and allow leakage of water into, and building heat out of, the failed joint areas. This is especially critical on flat roof installations where ponding at low points often allows substantial quantities of water to accumulate during a rainstorm. Under such circumstances, even a small pinhole can create a major leakage problem.

To obtain the longest possible lifetime of these roof panels requires great care to avoid application errors such as misalignments and sealer pinholes when assembling roofing panels in the field. This care tends to require both good weather during installation and a plurality of skilled workers to achieve the best results, and therefore, can be quite expensive. A panel joint which protects the joint sealing materials from environmental assault and subsequent failure will greatly enhance the final panel utility rating.

A third problem encountered in prior art panels has been the critical limiting strength of a roof assembled from such panels. Side and end joints have been the limiting considerations in establishing maximum panel width due to extreme expansion and contraction factors. By developing a stronger side and end joint structure which resists slippage and disengagement under stress, all of the problems noted above are substantially, if not totally, alleviated and other less critical parameters become controlling in determining final panel width. As a result panels having fewer joints can be economically produced. Construction costs are reduced, fire resistance rating is improved, and the long term environmental degradation of the panel system is reduced.

In addition, many prior art roof systems required that any previously used roofing system either be completely removed before they could be applied and/or that layers of a ballast or sealant materials such as a polymeric adhesive, tar, pitch or asphalt be used to hold them down. Use of ballast (as much as one (1) ton per 100 sq. ft.) greatly increases the support requirement of the building structure. A roofing system with structural value which does not have these limitations would significantly reduce costs by eliminating the need to remove and dispose of waste materials from the existing roof. This, in effect, causes the recycling of the existing roof materials, in place, by being able to apply the panel system over the existing materials. This ability greatly increases the ease with which the roofing system can be applied to particular construction applications thereby reducing costs and conserving landfill usage.

SUMMARY OF THE INVENTION

The panel of the present invention includes a pair of opposed top and bottom metal facing sheets, said sheets having particular side and end joint configurations. The topmost or facing metal sheet is exposed to view to the external weather environment and is customarily painted with a weather resistant polymeric paint. The two facing sheets are spaced apart, said spacing generally being maintained in the present invention by a first layer of plywood or wafer board positioned to lie directly under the top facing sheet and a second polyurethane or other thermally insulating foam layer positioned underneath the plywood layer and in contact with the inside surface of the bottom or liner metal sheet. Although light in weight, the plywood or wafer board is of sufficient thickness and strength that a worker can safely walk on each panel without fear of either falling through or damaging the panel in any other significant way. The rigid reinforcing layer of wood or wood materials permits the panel to be installed directly over open rafters or purlins in new construction. In the case of applying the panel over an existing roof, only the top sheet is required.

Secure long-lasting mating of the individual panels to form a finished roof assembly is accomplished by the end/side structure incorporated into each panel. At one end and along an adjacent side of each panel there is secured under the top facing sheet and on top of the wooden sheathing a "nailing hem." The facing sheet in these areas extends a short distance outwardly from the body of the panel to form the upper surface of a receiving slot or "pocket." The remainder of the pocket is formed by first bending the nailing hem downward along the exterior surface of the encapsulated internal thermal insulation and at the level of the bottom facing sheet bending it outwardly again. From this point the nailing hem extends some distance beyond the end (or side) of the panel to form the vertical side and bottom of the receiving pocket. The nailing hem extension is fabricated with a plurality of holes to receive nails or screws which serve to secure the panels mechanically to the underlying roof structure (or other support structures) without the necessity of applying either a ballast layer or a layer of an additional adhesive, tar or pitch to hold roof down. This method of fastening and mating one panel to another eliminates wind lift, a major cause of roof failure.

Within the cavity formed by the pocket are a strip of a low density closed cell foam sealant at the point where the nailing hem is bent downward and a first adhesive sealant band of adhesive sealant where the nailing hem is bent outward at the base liner sheet. A third sealing bead is positioned to the slanted outside portion of the nose section of the opposing end or side of the panel.

The nailing hem is also fabricated with a plurality of snap locks along the upper, side and lower surfaces of the receiving pocket and mating is accomplished with the structure at the opposite end and side of the panel. In this way the juxtaposed edges of the mating panels are shaped to form a nose which is encased with an extension of the cover sheet which is bent downwardly so as to form an open extension adapted to fit into and engage the snap locks in the nailing hem when the nose end of one panel is inserted into the pocket end of a second panel. Such insertion also serves to compress the foam sealant and spread out the two adhesive bands such that the gap between the two panels is substantially filled so that liquids cannot penetrate into the interior of the roof panels and heat cannot escape therefrom allowing for little structural or joint fatigue due to expansion and contraction. Also, since all of the sealant materials are inside the total structure, long term failure of the sealant joint due to environmental conditions is avoided. The concealment of the sealing system from the environment also allows for installation during all but the most severe weather conditions.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 is a fragmentary plan view of an assembled panel system according to the present invention;

FIG. 2 is an exploded isometric view of two individual panels configured as in the present invention;

FIG. 3 is fragmentary cross-section view of an unassembled building construction panel according to the present invention;

FIG. 4 is a fragmentary cross-section view of the assembled building construction panels according to the present invention showing the manner in which the panels are fitted together; and FIG. 5 is a cross sectional view of pocket and nose flashing elements adapted for use with the present invention.

DETAILED DESCRIPTION OF THE INVENTION

The following detailed description is of the best presently contemplated mode of carrying out the invention. This description is not intended in a limiting sense, but is made solely for the purpose of illustrating the general principles of the invention.

The various features and advantages of the present invention may be more readily understood with reference to the following detailed description, taken in conjunction with the accompanying drawings, wherein like numbers refer to the same feature or part thereof.

Referring now to FIGS. 1 and 2, there are shown first an isometric fragmentary view of a plurality of the panels 10 assembled into a finished roofing system and then a view of two separated panels 10 constructed as in the present invention. Serving as the top surface is a first cover sheet 12 which, as shown particularly in FIGS. 3 and 4, is bent downwardly along one side and an adjoining edge to form nose structure 14. This nose structure is formed first by bending an extension of the top cover sheet 12 to form a first slanted portion 16 which approximates an angle of between 30° and 60°. Next, the sheet is bent to form a second vertical portion 18 at an angle of about 90°. Finally, it is bent inwardly to form a snap lock engaging portion 20 which approximates an angle about −10° and −60°.

As is shown most clearly in FIG. 3, a portion of the internal structure of panel 10 is also cut away just behind the snap lock engaging portion 20 to form cutout 22. Although not shown with any particularity in the drawings, the top cover sheet 12 is preferred to be of metal, usually aluminum, and is customarily painted with a weather resistant polymeric paint to provide additional long term protection against pitting, oxidation and other environmental attack on the panel.

FIGS. 3 and 4 also show the top cover sheet 12 extending beyond the side and end opposite to those configured in the nose structure 14 to form an outward extension or overhang 24, the purpose of which will be described below.

Situated below cover sheet 12 is a first reinforcing layer 26, which is typically of a plywood, particle, wafer, or oriented strand board, between one-quarter and three-quarters inches; and preferably about one-half inch in thickness. The cover sheet 12 is attached to the reinforcing layers by a permanent adhesive. The preferred oriented strand board gives the finished product good mechanical strength in resisting bearing loads such as heavy snow or workers walking over the finished roof. Immediately below the reinforcing layer 26 is second thermal barrier layer 28, which is typically between three-eighth and three-quarters inches and, preferably also about one-half inch of a rigid closed cell foam material such as polyurethane or polystyrene. Completing the basic vertical structure of the basic panel 10 is a second liner sheet 30 (of a metallic substance similar to cover sheet 12) as the bottom most layer of the panel. The sheet 30 completely covers the bottom surface of the finished panel acting as a fire and chemical barrier protecting the foam thermal barrier 28 immediately above it.

The panel is completed by the incorporation of nailing hem 32 along the side and end opposite to those having the nose structure 14 thereon. The manner of attachment of nailing hem 32 to complete the assembly of panel 10 is best shown in FIGS. 3 and 4 and when installed serves to create a water-tight seal to complete the encapsulation of the foam thermal layer 28 within the confines of the finished panel 10.

As best shown in FIG. 3, nailing hem 32 comprises a first horizontal section 34 which is inserted between the lower surface of top cover sheet 12 and the upper surface of the reinforcing layer 26. At the point where the horizontal section 34 passes beyond the edge the reinforcing layer 26, nailing hem 30 is bent downward 90° along the outer faces of the reinforcing layer 26 and thermal barrier layer 28 to form vertical section 36. Finally, at the level of bottom cover sheet 28, nailing hem 32 is bent 90° again to form a second horizontal section 38 which extends outwardly from the body of panel 10 for a distance of between one and two inches. As shown in FIG. 3, factory punched into the horizontal extension 38 of nailing hem 32 are a plurality of upraised snap lock stops 40, the purpose of which will be explained in greater detail herein below. Also there are a plurality of punched holes which serve to receive and position securing screws or nails 44, thus facilitating mounting the finished panels 10 to a given substructure. Such mounting and securing can be easily and quickly accomplished with a conventional power nail or screw driver and no additional ballast layer or adhesive, tar or pitch layer is needed for this purpose. By mechanically fastening the roof panels 10 at their bottom most level, failure of the roofing system through "wind up-lift" is virtually eliminated by placing the fastening means at the point of leverage rather than on the top of the roof which is some distance from the leverage point.

In the position shown, nailing hem 32 essentially creates a weather-tight encapsulation of the thermal barrier layer 28 within the body of panel 10. The method of retaining nailing hem 32 in the panel structure is by adhesively bonding the nailing hem 32 in place at the factory to the upper surface of the reinforcing layer 26 and to the ends of the reinforcing layer and thermal barrier layer 28 to maintain the dimensional stability of the finished panel 10. Additionally, it is mechanically attached by stapling to the reinforcing layer 26. The cover sheet 12 is permanently adhered to the nailing hem 32 by use of any currently available adhesive strip to bond the metallic parts together.

Also, as shown best in FIG. 3, in this position the vertical and second horizontal extensions 36 and 38 of nailing hem 32 combine with the overhang 24 (which overhang is between about one-half and one and one-half inches in length) of upper cover sheet 12 to form a "pocket" structure 46 which acts to conformably receive the "nose" structure 14 when the panels 10 are assembled to form a finished roof assembly.

As shown with some particularity in FIGS. 3 and 4, the structure of pocket 46 further comprises, in combination, a continuous strip 48 of a low density foam sealant, such as polyurethane, fitted at the point where the horizontal section 34 is bent 90° to form vertical section 36, and a first continuous flexible silicone or polybutylene adhesive sealing bead 50 inside the corner between vertical section 36 and second horizontal section 38. Yet a third continuous silicone sealing bead 52 is affixed to the outside of the first slanted portion 16 of nose section 14. An alternative location to place the third continuous silicone sealing bead 52 is on the underside of overhang 24 which directly opposes the first slanted portion 16 of nose section 14. As shown most clearly in FIG. 2, all of these beads/strips run the entire length of the side and end portions of nose structure 14 and pocket structure 46, respectively. Each of the sealants 48, 50, and 52 are applied upon manufacture of the roofing panel to avoid mispositioning of the sealants and are protected until installation by an encapsulating protective tape strip.

When a pair of panels 10 are to be mated, as shown in FIG. 4, the nose structure 14 of one is merely inserted and manually pushed into the pocket structure 46 of the other, at which time and place the bent nose snap lock engaging section 20 is folded backwards into cutout 22 as it passes over the installed mounting nail/screw heads 44 and snap lock stops 40. No special tools or effort is needed to do this and once the snap lock passes beyond these obstructions, it will engage the snap lock stops 40. When this happens, the two panels are automatically spaced and firmly locked into a mated position and they cannot now be easily disengaged. At the same time, the continued inward insertion of nose structure 14 into pocket structure 46 contacts and successively compresses the three foam and sealant strips and/or beads 48, 50 and 52. This causes the sealants to flow into and substantially fill the interstitial space 54 between the two mated panels.

When the mating operation is completed as described above and shown in FIG. 4, the panel joint is substantially watertight and weatherproof, or otherwise resistant to thermal and fluid leakage. Furthermore, the three sealing strips are completely contained within the body of the assembled panel joint. As a result, environmental degradation problems encountered with prior art devices simply do not occur to anything like the same degree. While, at the conclusion of the mating operation there will still be a slight gap between the two panels so mated, this, typically will be approximately one-eighth inch. This is more than adequate to accommodate any movement, settlement, expansion or contraction of the building substructure or roof system.

As shown particularly in FIG. 1, application of the roofing panels to given operation typically starts at a corner of the project with a pocket shaped flashing 56, as shown more particularly in FIG. 5, serving to accept and hold the nose shaped end or side of the first course of panels. The pocket shaped wall flashing 56 can also be used to overlay a cut end of the panel 10 as shown to the right side of FIG. 1, and in FIG. 5. As noted above, no special tooling or fixturing is required. Conventional hammers and power nail or screw drivers are more than adequate to mechanically affix the panels and flashings to the roof or wall substructure. Further, the three foam and sealing strips 48, 50 and 52 are applied during factory assembly of the panel 10, so the finished roof assembly requires fewer workers and relatively little in the way of tooling to achieve the results described herein above.

Typically, the panels 10 are 2 feet wide and 8 feet long, as shown in FIG. 1 shorter and or wider panels can easily be produced. Typically, as shown in FIG. 1, half length panels 60 are used to start the second course to allow staggering of the panel rows. The above described method of mating the panels is quite simple and generally has a minimum of labor and tooling requirements. Since only mechanical attachment means are used and adhesive, pitch, tar sealers, or ballast are not needed, the panels can be applied both to new construction and the repair or replacement of an existing roof system with minimum difficulty.

In the event that chimneys, overflow pipes, vent stacks, skylights and other upward or outward projections prevent laying a full length or full width panel, one or more standard, or nose or pocket containing flashing strips 56, 58, such as those shown in FIG. 5, can be applied along the cut edges to both allow portions of the panels to be cut as necessary to fit into a gap or around or against a structure and to continue the use of the full size panels. The end or wall flashing 56 has an extension portion 62 bent at 90° to a vertical portion 64 which overlies and covers the cut end or nose structure of the panel 10 sealing the end or side of said panel. Attachment, through or into the panel 10, is accomplished by the mechanical means above-described with the use of a foam sealant 66 placed between the underside of the extension portion 62 and the cover sheet 12 of the panel 10. A bead of silicone sealant 68 is placed outside the foam sealant 66 and against the cover sheet 12 to complete the end or side seal.

Likewise, the wall or abutment flashing 58 has an extension portion 70 at right angles to a vertical portion 72 with a foam sealant 74 placed between the underside of the extension portion 70 and the cover sheet 12 of the underlying panel 10. A bead of silicone sealant 76 is placed outside the foam sealant to complete the seal. Also, a bead of silicone sealant 78 is placed along the uppermost edge of the vertical portion 72 to prevent seepage of liquid around the abutment or protruding structure or into the roof system along the wall or other vertical substructure.

The most critical aspect of roof installation, that of making watertight seams, is removed from the installer and placed in a self-contained manner in the roof panel. The combination of the "pocket" and the triple sealant system installed in the factory under control conditions virtually eliminates the variables of skilled labor and weather conditions found at the job site with the roof panel system of the present invention. The combination of the unique sealing system and the mechanical fastening system makes installation of the roof panel system in almost any weather condition, including high wind, rain and extreme heat, during which other roof systems cannot be properly installed. In new construction this ability is critically important because the completion of interior work must be delayed until the roof is installed to create a "dry" internal work space.

The concealed, and insulated, mechanical fastening system located within the "pocket" assists in the non-transference of heat and cold into or out of the building through the fasteners. The ability to locate the fasteners under the primary roof insulation also adds to the life of the roof by eliminating a major source of joint fatigue brought about by the continuing cycle of expansion and contraction inherent in the structure which loosens the fasteners. Covering the joint sealant system with a lightweight metal skin protects the various seals and sealant materials from deterioration by exposure to the environment, i.e. weather conditions, ultra-violet light, etc. thereby providing a potential longevity not currently available in flat-type roofing.

The self-contained sheathing of the panel with a lightweight metal enhances material handling both in manufacture and in job site installation. The sheathing also permits direct overlayment of existing roofs without the need or expense to remove the existing materials and dispose of them. Utilizing the "old" roof as a substrate for the roof panel system of the present invention inherently recycles the old roof using it as an additional insulating layer under the "new" roof. This re-using of the existing roof materials is an environmentally sound practice which eliminates the removal and dumping of the old roof materials and then permits site recycling with no added cost or deleterious effects. The present invention, in addition to the environmental advantages already discussed, also provides significant energy savings by inherently adding thermal barriers to prevent heat loss in cold climates and heat gain in warm climates without pollution of the environment by installation method or release of chemical vapors from the installed roofing system.

On roofs which are not flat (inclined roofs), the application of the panel system of the present invention begins at the top or peak of the roof with the installer working row by row toward the bottom. This is the opposite of existing installation methods which start at the bottom and work upwards to achieve the required overlapping of shingles or other materials. The advantages in beginning at the peak of the roof include eliminating the need to walk over the completely installed roof as the job progresses; the need to fasten roof jacks into already installed roof materials, if the pitch of the roof requires planks for installation or storing of roof materials; and permitting the run-off of water over the downward facing unfinished edge of the lowest row of panels rather than puddling against an upward facing edge reducing the chance for leakage into the structure or damage to the new roof.

The panel system of the present invention, because it comprises a complete structural member, may also be adapted for use in a substantially vertical orientation to cover a wall or vertical section of a roof, or a "roof-over" mobile homes, or building in a slope to drain flat roofs, without departing from the teachings of the invention. The nose and pocket structure of the panel is further designed so that only a limited number of tools and a minimum amount of labor is needed to assemble the finished roof.

Thus there has been described a new and improved roof and wall panel system. It is to be understood that the above-described embodiments are merely illustrative of the many specific embodiments which represent applications and uses of the present invention. Clearly, numerous other arrangements can be readily devised by those of skill in the art without departing from the spirit and scope of the invention as defined in the appended claims and all changes which come within the scope and equivalency of these claims are intended to be embraced therein.

I claim:

1. A structural roof panel system for use upon a pre-existing or new structure comprising a series of coplanar panels assembled edge-to-edge at their respective ends and sides, each of said panels of the system comprising;
   a first thin metallic skin as a rectangular top plate, said top plate having an angularly downturned edge along one side and along one end and a horizontally extending overhanging strip along the side and end opposite to those having said angularly down turned edge, said angularly down turned edge being further downwardly bent to form a nose means having a snap lock engaging means along the bottom edge of the nose means of said panel;
   a first layer of a reinforcing material within the body of said panel and positioned immediately below said metallic top plate;
   a second layer of a thermally protective material positioned below said reinforcing layer;
   a second metal facing sheet below said thermal protective layer;
   a nailing hem having a first horizontal portion fixedly attached below the overhanging strip of said top plate at the end and side opposite to those having said down turned nose means, said nailing hem further being bent into a downwardly directed vertical portion fitted around the open ends of said reinforcing and thermally protective layers, and at the level of said base plate, being further bent to form an outwardly directed second horizontal portion projecting beyond the end or side of said panel, said horizontal portion further having a spaced apart plurality of snap lock stops and a spaced apart plurality of mounting holes therein;

said nailing hem cooperating with said overhanging strip of said top sheet to form a pocket means in a first panel for accepting said nose means of a second panel placed adjacent the first panel;

said system further comprising at least one sealing strip within the interior of said pocket means of said first panel and at least one sealing strip on the exterior of the nose means of said second panel such that when said first panel is firmly attached to the underlying substructure mating with said second panel can occur when the nose means of said second panel is inserted into the pocket means of said first panel engaging said snap lock stops to sealingly engage and compress said plurality of at least one sealing strips sealing the joint created between the pocket and nose means of said first and second panels such that said joint is becomes resistant to thermal and fluid leakage.

2. In the panels of claim 1, said metallic top and bottom cover sheets are aluminum.

3. In the panels of claim 1, said reinforcing layer is plywood or molded particle board having a preferred thickness in the range between one-quarter and about three-quarter inches.

4. In the panels of claim 1, said thermally protective layer is a polyurethane or polystyrene foam having a preferred thickness in the range between three-eighth and three-quarter inches.

5. In the panels of claim 1, said cover sheet overhanging strip is preferably dimensioned in the range between one-half and one and one-half inches.

6. In the panels of claim 1, said second horizontal section of said nailing hem is preferably dimensioned in the range between one and two inches.

7. In the panels of claim 1, the thermal protective layer is partially cut away to accommodate said snap lock engaging means and fastener means attached through said nailing hem.

8. In the panels of claim 1, said plurality of at least one sealing strip comprises, in combination, a first continuous closed cell foam sealing strip placed at the junction of the cover sheet overhanging strip and the downwardly directed vertical portion of said nailing hem and a second continuous bead adhesive sealing strip placed near the junction of said downwardly directed vertical nailing hem section and the outwardly directed second horizontal portion of said nailing hem, and a third continuous bead adhesive sealing strip placed on the upward facing downwardly slanted surface of said nose means such that when said panels are assembled to form a continuous structure, said plurality of sealing strips will deform to substantially fill the gap between the mated panels.

9. In the panels of claim 8, said first sealing strip is a low density closed cell foam sealant.

10. In the panels of claim 8, said second sealing strip is a silicone adhesive sealant.

11. In the panels of claim 8, said third sealing strip is a silicone or polybutylene adhesive sealant.

12. A structural roof panel system for use upon a pre-existing or new structure comprising a series of coplanar panels assembled edge-to-edge at their respective ends and sides, each of said panels of the system comprising;

a thin metallic skin as a rectangular top plate, said top plate having an angularly downturned edge along one side and along one end and a horizontally extending overhanging strip along the side and end opposite to those having said angularly down turned edge, said angularly down turned edge being further downwardly bent to form a nose means having a snap lock engaging means along the bottom edge of the nose means of said panel;

a first layer of a reinforcing material within the body of said panel and positioned immediately below said metallic top plate;

a second layer of a thermally protective material positioned below said reinforcing layer;

a nailing hem having a first horizontal portion fixedly attached below the overhanging strip of said top plate at the end and side opposite to those having said down turned nose means, said nailing hem further being bent into a downwardly directed vertical portion fitted around the open ends of said reinforcing and thermally protective layers, and at the level of said base plate, being further bent to form an outwardly directed second horizontal portion projecting beyond the end or side of said panel, said horizontal portion further having a spaced apart plurality of snap lock stops and a spaced apart plurality of mounting holes therein;

said nailing hem cooperating with said overhanging strip of said top sheet to form a pocket means in a first panel for accepting said nose means of a second panel placed adjacent the first panel;

said system further comprising at least one sealing strip within the interior of said pocket means of said first panel and at least one sealing strip on the exterior of the nose means of said second panel such that when said first panel is firmly attached to the underlying substructure mating with said second panel can occur when the nose means of said second panel is inserted into the pocket means of said first panel engaging said snap lock stops to sealingly engage and compress said plurality of at least one sealing strips sealing the joint created between the pocket and nose means of said first and second panels such that said joint is becomes resistant to thermal and fluid leakage.

13. In the panels of claim 12, said metallic top and bottom cover sheets are aluminum.

14. In the panels of claim 12, said reinforcing layer is plywood or molded particle board having a preferred thickness in the range between one-quarter and about three-quarter inches.

15. In the panels of claim 12, said thermally protective layer is a polyurethane or polystyrene foam having a preferred thickness in the range between three-eighth and three-quarter inches.

16. In the panels of claim 12, said cover sheet overhanging strip is preferably dimensioned in the range between one-half and one and one-half inches.

17. In the panels of claim 12, said second horizontal section of said nailing hem is preferably dimensioned in the range between one and two inches.

18. In the panels of claim 12, the thermal protective layer is partially cut away to accommodate said snap lock engaging means and fastener means attached through said nailing hem.

19. In the panels of claim 12, said plurality of at least one sealing strip comprises, in combination, a first continuous closed cell foam sealing strip placed at the junction of the cover sheet overhanging strip and the downwardly directed vertical portion of said nailing hem and a second continuous bead adhesive sealing strip placed near the junction of said downwardly directed vertical nailing hem section and the outwardly directed second horizontal portion of said nailing hem, and a third continuous bead adhesive sealing strip placed on the upward facing downwardly slanted surface of said nose means such that when said panels are assembled to form a continuous structure, said plurality of sealing strips will deform to substantially fill the gap between the mated panels.

20. In the panels of claim 19, said first sealing strip is a low density closed cell foam sealant.

21. In the panels of claim 19, said second sealing strip is a silicone adhesive sealant.

22. In the panels of claim 19, said third sealing strip is a silicone or polybutylene adhesive sealant.

23. In a structural roof panel system having a plurality of panels each having at least a top cover sheet and a reinforcing and thermal protective layer, the improvement comprising a nose means along one end and one side of a first panel, said nose means having at its outermost end a snap lock engaging means and being configured to conformably fit into a mating pocket means along an opposing end or side portion of a second panel, said pocket means having a plurality of spaced apart mounting holes for firmly attaching said second panel to the roof substructure, a spaced apart plurality of snap locks adapted to engage the snap lock engaging means of said inserted nose means and firmly join the two panels, and a plurality of sealing strips positioned to contact said nose means and said pocket means and be deformed to seal any gap within the joint formed by said nose means and said pocket means creating a barrier resistant to thermal and fluid leakage.

24. In the panel system of claim 23, the plurality of sealing strips being entirely enclosed and covered by said at least one cover sheet and said pocket means for preventing premature deterioration and failure due to exposure to the effects of the external environment.

* * * * *